(12) United States Patent
Naydenov et al.

(10) Patent No.: US 12,431,544 B2
(45) Date of Patent: Sep. 30, 2025

(54) SYNTHETIC PROTON-CONDUCTIVE ADDITIVES FOR BATTERY ELECTROLYTES

(71) Applicants: Vesselin Bojidarov Naydenov, Sofia (BG); Dag Arild Valand, Wachtberg (DE); Boris Ivanov Monahov, Apex, NC (US); Boris Todorov Shirov, Sofia (BG)

(72) Inventors: Vesselin Bojidarov Naydenov, Sofia (BG); Dag Arild Valand, Wachtberg (DE); Boris Ivanov Monahov, Apex, NC (US); Boris Todorov Shirov, Sofia (BG)

(*) Notice: Subject to any disclaimer, the term of this patent is extended or adjusted under 35 U.S.C. 154(b) by 199 days.

(21) Appl. No.: 17/553,074

(22) Filed: Dec. 16, 2021

(65) Prior Publication Data
US 2022/0200060 A1    Jun. 23, 2022

Related U.S. Application Data

(60) Provisional application No. 63/127,290, filed on Dec. 18, 2020.

(51) Int. Cl.
*H01M 10/08* (2006.01)
(52) U.S. Cl.
CPC .... *H01M 10/08* (2013.01); *H01M 2300/0011* (2013.01)
(58) Field of Classification Search
CPC .................................................. H01M 10/08
See application file for complete search history.

(56) References Cited

U.S. PATENT DOCUMENTS

| | | | | |
|---|---|---|---|---|
| 4,168,352 A | * | 9/1979 | Dick | B01D 69/107 429/204 |
| 5,518,838 A | * | 5/1996 | Bai | H01M 10/0565 429/207 |
| 6,197,451 B1 | | 3/2001 | Steinbrecher et al. | |
| 6,509,118 B1 | | 1/2003 | Pavlov et al. | |
| 8,716,982 B2 | * | 5/2014 | Aanensen | H02J 7/0069 320/139 |
| 2005/0053840 A1 | * | 3/2005 | Jo | H01M 4/131 429/255 |

(Continued)

FOREIGN PATENT DOCUMENTS

| | | | | |
|---|---|---|---|---|
| CN | 106410288 A | * | 2/2017 | |
| CN | 108987824 A | * | 12/2018 | ............ H01M 10/10 |

(Continued)

OTHER PUBLICATIONS

Translation of CN 106410288 A (Year: 2017).*

(Continued)

*Primary Examiner* — Imran Akram
(74) *Attorney, Agent, or Firm* — Alston & Bird LLP

(57) ABSTRACT

An electrolyte system for improving electrolyte performance characteristics is provided. The electrolyte system includes an electrolyte, and a synthetic proton-conductive polymer additive. A cell comprising said electrolyte system and a method of making the same is also disclosed herein. The synthetic proton-conductive polymer additive may be used in conjunction with a bipolar overvoltage battery pulser to improve overall battery performance.

13 Claims, 4 Drawing Sheets

(56) References Cited

U.S. PATENT DOCUMENTS

| | | | |
|---|---|---|---|
| 2009/0026662 A1* | 1/2009 | Yun | H01M 10/0431 |
| | | | 264/466 |
| 2014/0170477 A1 | 6/2014 | Mase et al. | |
| 2015/0064538 A1* | 3/2015 | Bosnyak | H01M 4/622 |
| | | | 429/251 |
| 2019/0148735 A1* | 5/2019 | Guo | H01M 4/38 |
| | | | 429/204 |
| 2020/0119391 A1* | 4/2020 | Ma | H01M 4/131 |
| 2020/0176198 A1* | 6/2020 | Adams | H01G 11/28 |

FOREIGN PATENT DOCUMENTS

| | | | | |
|---|---|---|---|---|
| CN | 105914400 B | * | 6/2019 | ............ H01M 10/05 |
| CN | 107666012 B | * | 10/2019 | ............ H01M 10/08 |
| JP | 2019160403 A | | 9/2019 | |
| KR | 100397069 B1 | * | 9/2003 | ............. H01M 10/08 |
| KR | 20090069353 A | * | 7/2009 | .............. H01M 8/10 |
| KR | 20120114716 A | * | 10/2012 | .......... H01M 10/052 |
| WO | WO-2011/138038 A2 | | 11/2011 | |
| WO | WO 2019/217759 A1 | | 11/2019 | |

OTHER PUBLICATIONS

CN106410288A translation (Year: 2017).*
International Preliminary Report on Patentability mailed Jun. 29, 2023 (9 pages).
International Search Report and Written Opinion (ISA/US) mailed Mar. 21, 2022 (10 pages).
Extended European Search Report for European Patent Application No. 21908045.4 dated Jul. 3, 2025 (9 pages).

* cited by examiner

SYNTHETIC PROTON-CONDUCTIVE ADDITIVES FOR BATTERY ELECTROLYTES

CROSS-REFERENCE TO RELATED APPLICATIONS

The present application claims priority to and the benefit of U.S. Provisional Patent Application No. 63/127,290, filed Dec. 18, 2020, the contents of which is incorporated herein by reference in its entirety.

FIELD OF INVENTION

Example embodiments of the present disclosure relate generally to electrolyte systems for improving electrolyte performance characteristics, and more particularly to electrolyte systems incorporating synthetic proton-conductive polymer additives, methods of preparing the same, and batteries including the same.

BACKGROUND

The imposed higher technical and technological requirements for various types of lead-acid batteries are based on the adopted modern technical and environmental standards. These standards address the emerging technical and technological advancements in all branches of industry, military and national security, health care, education, and research, as well as in everyday people's lives. Therefore, current lead-acid batteries should fully meet all performance requirements set forth in the adopted standards and regulations.

The basic performance characteristics that current lead-acid batteries should have so as to meet the standard requirements include: long service life, high reliability, minimum maintenance or maintenance-free service, sufficiently high energy return factor throughout their service life, and manageability when connected to various electric energy consumers.

The basic components building a lead-acid battery are known to be the positive and negative active materials, and an electrolyte comprising sulfuric acid solution. Some lead-acid batteries further include a separator(s). In order to achieve high energy return energy efficiency and long service life of lead-acid batteries, it is essential not only to have appropriate chemical and phase composition of the positive and negative active masses, but also to use an electrolyte of adequate composition and concentration meeting the respective qualitative standards. Hence, the composition and the concentration of the electrolyte, as one of the basic building components of the battery, exert a major influence on the electrochemical processes that take place during battery manufacture and operation. The specific properties of the electrolyte are dependent on the specific properties of the additives it contains. Moreover, the amounts of additives introduced in the electrolyte of lead-acid batteries is of great importance. The quantity of the respective electrolyte additives may have a significant impact on the electrochemical processes that proceed in lead-acid batteries during their manufacture and operation.

Lead-acid batteries are one of the most widely used types of secondary energy sources. Contemporary lead-acid batteries have a number of advantages that make them the preferred choice compared to other secondary power source chemistries. These advantages include: low production costs due to the fact that more than 90% of the resources for their manufacture come from recycled materials; reliable technology for battery manufacture and maintenance as a result of lengthy mass production practices; electrical characteristics allowing high acceptable upper limits of the charge and discharge currents; and nearly complete recyclability.

Despite their virtues, lead-acid batteries have some disadvantages as well, which currently limit the fields of their application. Examples of these disadvantages are a relatively short shelf life when stored in a discharged state, a relatively low number of cycles that a battery can complete in deep discharge cycling applications, relatively high charge time on cycling with high currents, and an inability to operate at low ambient temperatures.

Accordingly, there still exists a need for additives that relieve these shortcomings of lead-acid batteries.

BRIEF SUMMARY

One or more embodiments of the invention may address one or more of the aforementioned problems. Certain embodiments according to the invention provide electrolyte systems incorporating synthetic proton-conductive polymer additives, methods of preparing the same, and batteries including the same. In particular, according to a first aspect of the invention, an electrolyte system for improving electrolyte performance characteristics is provided. The electrolyte system includes an electrolyte and a synthetic proton-conductive polymer additive.

According to certain embodiments, the synthetic proton-conductive polymer additive may comprise polyvinylpyrrolidone or any derivative thereof. In some embodiments, the polyvinylpyrrolidone derivative may comprise polyvinylpyrrolidone-co-styrene, copovidone, polyvinylpyrrolidone-vinylacetate, or polyvinylpyrrolidone having one or more functional groups comprising NH, S, O, or a halogen.

According to certain embodiments, the electrolyte system may comprise from about 0.01 to about 3 weight percent (wt %) of the synthetic proton-conductive polymer additive. In further embodiments, the electrolyte system may comprise from about 0.1 to about 0.6 weight percent of the synthetic proton-conductive polymer additive.

According to certain embodiments, the electrolyte may comprise a high degree of electrolyte dissociation.

In accordance with a second aspect of the invention, a battery having improved electrolyte performance characteristics is provided. The battery includes at least two electrodes and an electrolyte system. The electrolyte system comprises an electrolyte and a synthetic proton-conductive polymer additive.

According to certain embodiments, the synthetic proton-conductive polymer additive may comprise polyvinylpyrrolidone or a polyvinylpyrrolidone derivative. In some embodiments, the polyvinylpyrrolidone derivative may comprise polyvinylpyrrolidone-co-styrene, copovidone, polyvinylpyrrolidone-vinylacetate, or polyvinylpyrrolidone having one or more functional groups comprising NH, S, O, or a halogen.

According to certain embodiments, the electrolyte system may comprise from about 0.01 to about 3 weight percent of the synthetic proton-conductive polymer additive. In further embodiments, the electrolyte system may comprise from about 0.1 to about 0.6 weight percent of a synthetic proton-conductive polymer additive.

According to certain embodiments, the electrolyte may comprise a high degree of electrolyte dissociation.

According to certain embodiments, the battery may comprise a lead-acid battery. In some embodiments, the lead-acid battery may comprise a starter lead-acid battery, a stationary lead-acid battery, an industrial lead-acid battery, or a traction lead-acid battery.

According to certain embodiments, the battery is coupled with a bipolar overvoltage battery pulser.

In accordance with a third aspect of the invention, a method of preparing a battery having improved electrolyte performance characteristics is provided. It is noted that the method described herein is not described in any mandatory order and steps are fluid with respect to when in time they occur during the preparation of the battery. In certain embodiments, the method includes forming an electrolyte system, wherein forming an electrolyte system comprises providing an electrolyte and providing a synthetic proton-conductive polymer additive; and forming the battery.

According to certain embodiments, the electrolyte system comprising the electrolyte and the synthetic proton-conductive polymer may be formed by adding the synthetic proton-conductive polymer additive to the electrolyte before forming the battery. In other embodiments, providing the synthetic proton-conductive polymer may comprise adding the synthetic proton-conductive polymer additive to the electrolyte after forming the battery (i.e. the electrolyte and the synthetic proton-conductive polymer additive are dispensed into the outer casing independently, thereby forming the electrolyte system within an outer casing). In further embodiments, the battery may comprise at least two electrodes, and forming the electrolyte system may comprise depositing particles of the synthetic proton-conductive polymer additive on a surface of one or more of the electrodes.

Additionally, or alternatively, in some embodiments, forming the battery comprises providing an outer casing. The outer casing may be any container or similar that functions to contain the electrolyte system and the two or more electrodes, wherein at least one electrode is a positively charged electrode and at least one electrode is a negatively charged electrode. Additionally, or alternatively still, in certain embodiments, forming the battery includes providing a separator.

According to certain embodiments, the synthetic proton-conductive polymer additive may comprise polyvinylpyrrolidone or a polyvinylpyrrolidone derivative.

According to certain embodiments, the method may further comprise coupling the battery with a bipolar overvoltage battery pulser.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
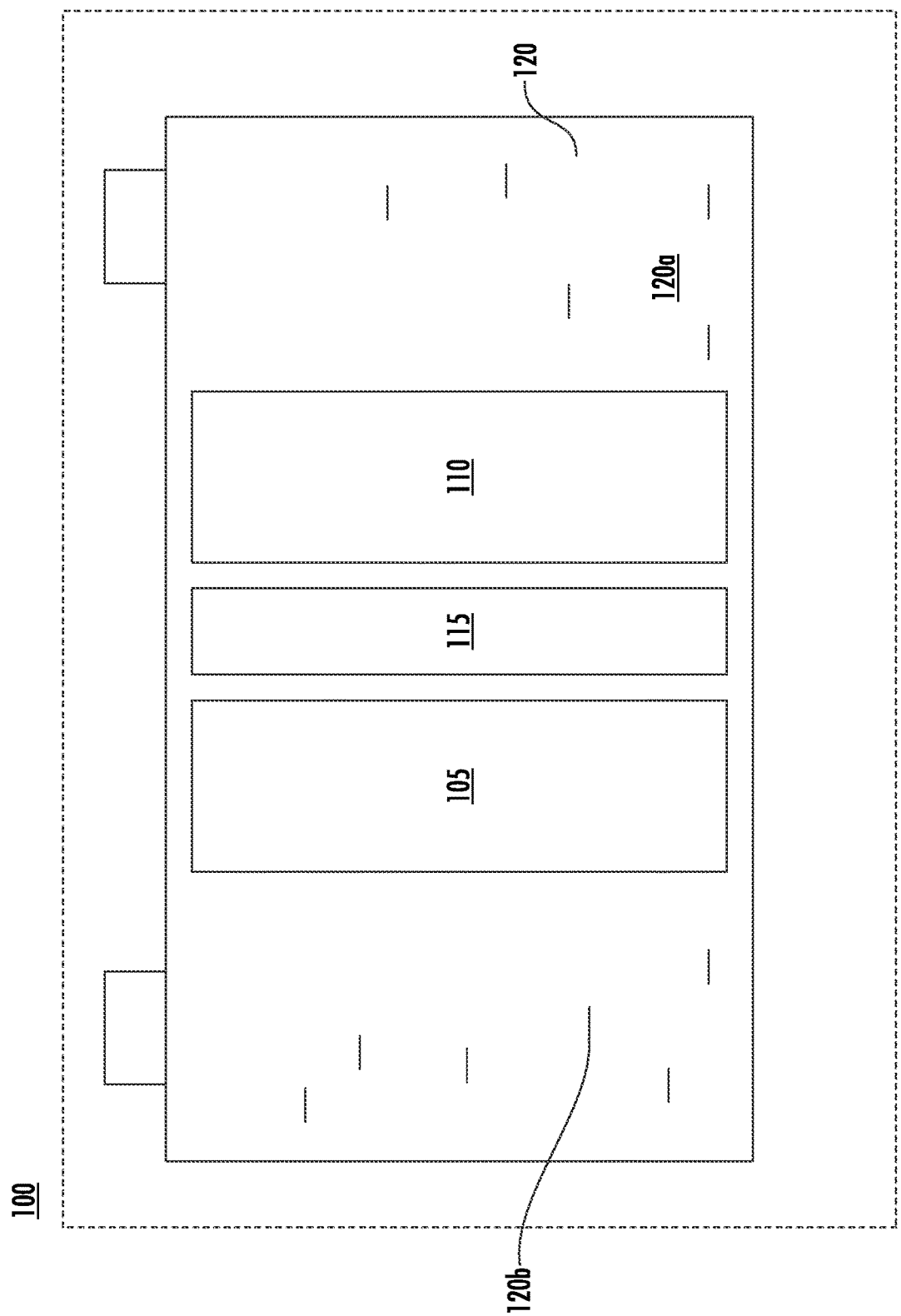
Figure 2:
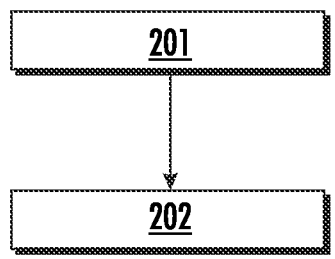
Figure 3:
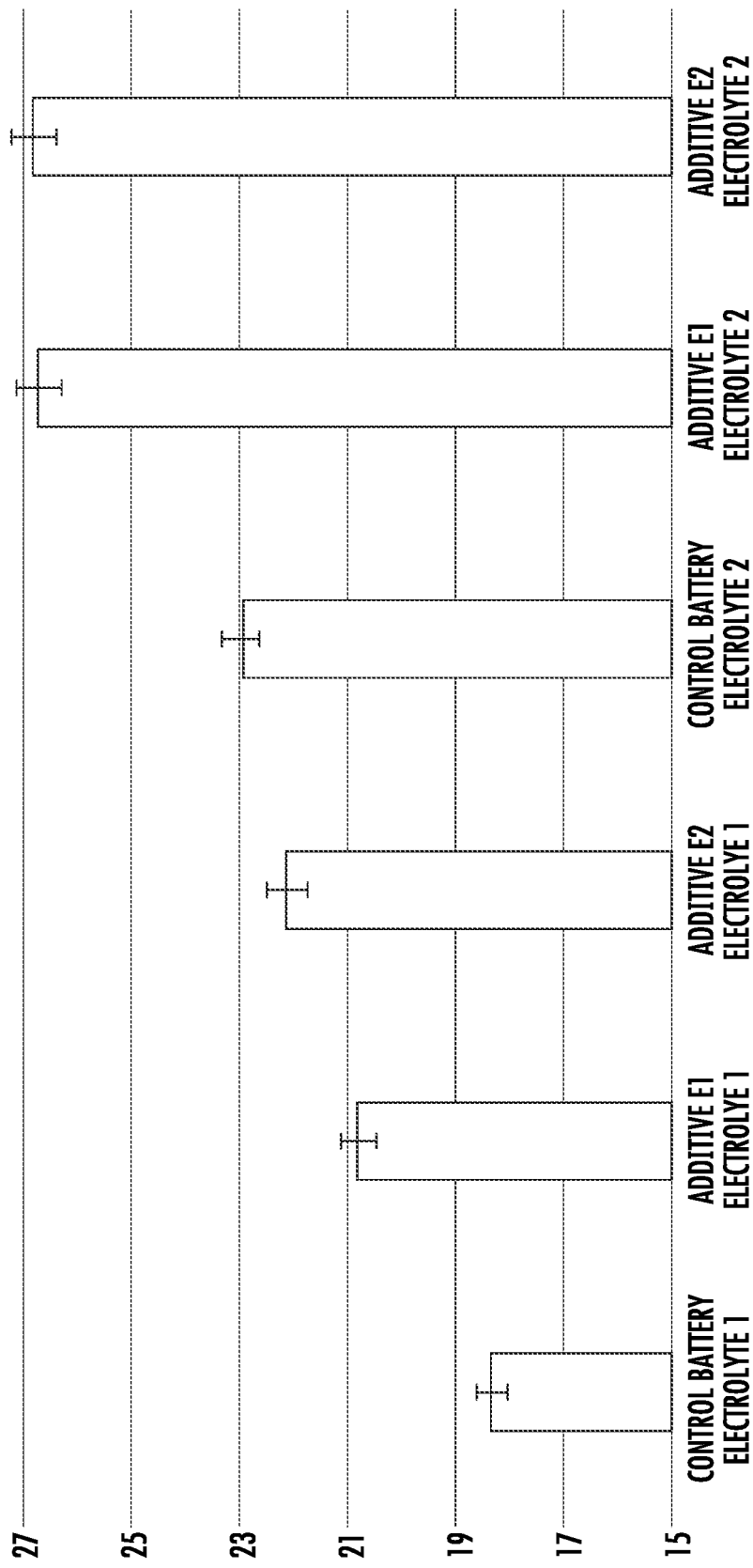
Figure 4:
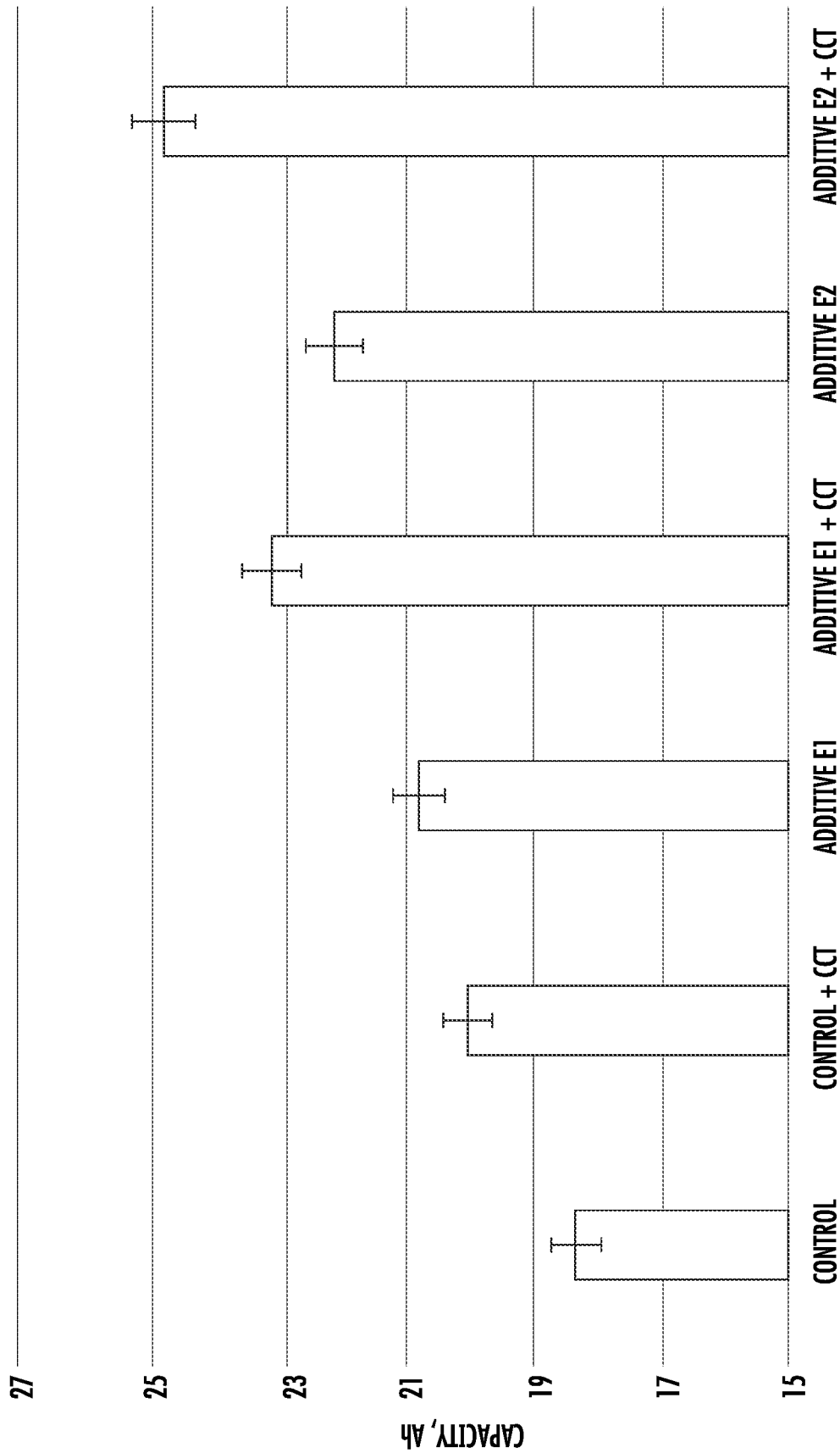

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 depicts an example battery in accordance with some embodiments disclosed herein;

FIG. 2 is a flowchart showing example steps involved in a method of producing a battery in accordance with various aspects of the subject disclosure;

FIG. 3 shows the results of a trial comparing the performance characteristics of two embodiments of the present disclosure with each other and control batteries; and FIG. 4 shows the results of a trial comparing the performance characteristics of two embodiments of the present disclosure with each other and control batteries, both with and without coupling the batteries with a bipolar overvoltage battery pulser.

DETAILED DESCRIPTION

One or more embodiments now will be described more fully hereinafter with reference to the accompanying drawings, in which some, but not all embodiments of the inventions are shown. Indeed, this invention may be embodied in many different forms and should not be construed as limited to the embodiments set forth herein; rather, these embodiments are provided so that this disclosure will satisfy applicable legal requirements. As used herein, the description may refer to an example "apparatus." However, elements of the apparatus described herein may be equally applicable to the claimed system and/or method. Accordingly, use of any such terms should not be taken to limit the spirit and scope of embodiments of the present disclosure. Like numbers refer to like elements throughout. As used in the specification, and in the appended claims, the singular forms "a", "an", "the", include plural referents unless the context clearly dictates otherwise.

As described previously herein, contemporary lead-acid batteries have a number of advantages that make them the preferred choice compared to other secondary power source chemistries. These advantages include: low production costs due to the fact that more than 90% of the resources for their manufacture come from recycled materials; reliable technology for battery manufacture and maintenance as a result of lengthy mass production practices; electrical characteristics allowing high acceptable upper limits of the charge and discharge currents; and nearly complete recyclability.

Nevertheless, lead-acid batteries also have a number of disadvantages. Examples of these disadvantages are a relatively short shelf life when stored in a discharged state, a relatively low number of cycles that a battery can complete in deep discharge cycling applications, relatively high charge time on cycling with high currents, and an inability to operate at low ambient temperatures.

Through combined effort and innovation, the inventors have developed an approach to mitigating or overcoming some of these deficiencies, namely, the disclosure herein describes the use of synthetic proton conductive additives in the electrolyte of a battery in order to improve performance characteristics of the battery. Addition of synthetic proton conductive polymers, such as polyvinylpyrrolidone or its derivatives, to the electrolyte of lead-acid batteries will help to alleviate some of the shortcomings of lead-acid batteries by (i) prolonging the shelf life of a battery when stored in discharged state, (ii) creating conditions for increasing the number of cycles a battery can complete in deep discharge cycling applications, (iii) reducing the charge time on cycling with high currents and thus allow shortening of the time needed for battery charging, and (iv) creating conditions for operation at low ambient temperatures. As such, due to the specific features of polyvinylpyrrolidone or its derivatives as synthetic proton conductive additives for the electrolyte of lead-acid batteries, the electrochemical processes during formation of the active masses, as well as the charge and discharge processes during battery operation, will proceed more efficiently.

With reference to FIG. 1, an example battery 100 in accordance with some embodiments is shown. Battery 100 may comprise two or more electrodes 105, 110 and an electrolyte system 120. In some embodiments, the two or more electrodes 105, 110 comprise at least one negative electrode 105 and at least one positive electrode 110. In some embodiments, the battery 100 further comprises a separator 115. In some embodiments the electrolyte system 120 comprises an electrolyte 120a and a synthetic proton-conductive polymer additive 120b. In some further embodiments, the battery 100 comprises an outer casing 101 and the two or more electrodes 105, 110 and the electrolyte system 120 are disposed within the outer casing 101 of the battery 100 as depicted in FIG. 1.

In this regard, the invention includes, according to certain embodiments, electrolyte systems incorporating synthetic proton-conductive polymer additives, batteries including the same, and methods of preparing the same. In particular, according to a first aspect of the invention, an electrolyte system for improving electrolyte performance characteristics is provided. The electrolyte system includes an electrolyte and a synthetic proton-conductive polymer additive.

According to certain embodiments, the synthetic proton-conductive polymer additive may comprise polyvinylpyrrolidone, polyacetylene, polypirole, polythiophene, polyaniline, polysulfide-r-fenilen, poly-para-fenilen-vinyl, or a derivative thereof. In some embodiments, the synthetic proton-conductive polymer additive 130b is a polyvinylpyrrolidone or a derivative thereof. The polyvinylpyrrolidone derivative may comprise polyvinylpyrrolidone-co-styrene, copovidone, polyvinylpyrrolidone-vinylacetate, or polyvinylpyrrolidone having one or more functional groups comprising P—O, P—N, P—NO, NH, S, O, a halogen (e.g., I, Cl, Br, etc.), and/or the like. Further derivatives may include homo derivatives of vinylpyrrolidone (e.g., N-vinylpyrrolidone monomer), as well as amorphous linear polymers with varying viscosity. Moreover, in some embodiments, polyvinylpyrrolidone may be bound with various chemical compounds depending on the composition of the medium in which it is placed (e.g., aqueous medium, acidic medium, alcohol medium, etc.).

According to certain embodiments, one or more synthetic proton-conductive polymer additives may be used in an electrolyte. In some embodiments, only one additive may be used because the presence of more additives may adversely affect the processes of nucleation and crystal growth when the processes of charge and discharge or in the mode of float charge, both for lead-acid batteries and for other types of secondary electrochemical power sources. In further embodiments, other additives that do not reduce the main positive properties of the main proton-conducting additives when added to the electrolyte of lead-acid batteries may be used. For example, any other additives that are used may not disrupt the ability of the synthetic proton-conductive polymer additive(s) to adsorb on the surfaces of the crystalline phases that build the positive and negative electrodes of lead-acid batteries.

While polyvinylpyrrolidone and polyvinylpyrrolidone derivative synthetic proton-conductive additives are referred to throughout the present disclosure, the synthetic proton-conductive polymer additives are not so limited. In certain embodiments, for example, the synthetic proton-conductive polymer additive may comprise polyacetylene, polypyrrole, polythiophene, polyaniline, polysulfide-r-phenylene, poly (p-phenylene vinylene), polyindole, polypyrene, polycarbazole, polyazulene, polyazerine, polyfluorene, polynaphthalene, or any derivative thereof, or any combinations thereof.

Polyvinylpyrrolidone is a synthetic proton conductive polymer, derivative of acetylene, and is made from the organic substance N-vinylpyrrolidone. Polyvinylpyrrolidone (PVP) is also known as povidone, polyvidone, poly-N-vinylpyrrolidone, or poly-[1-(2-oxo-1-pyrrolidinyl)-ethylene]. It is a non-toxic synthetic polymer comprising a mixture of amphoteric polymers of different viscosity. Polyvinylpyrrolidone and its derivatives are soluble in water and chemically stable at all pH levels.

The chemical formula of polyvinylpyrrolidone (PVP) is $C_6H_9NO$, its molar mass varies between 2500 and 2,500,000 grams per mole (g/mol), its density is 1.2 g/cm$^3$, its melting point is 150-180° C., it has an electroconductivity of $10^3$ C/cm$^3$, and it has the following structural formula:

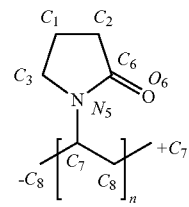

Polyvinylpyrrolidone and polyvinylpyrrolidone derivative synthetic proton-conductive additives are chemically stable in sulfuric acid solution and resistant to high positive potentials. When such additives are introduced in the electrolyte of lead-acid batteries they contribute to stabilization of the structure, composition and morphology of the active masses. The observed positive effects of the use of the synthetic proton-conductive polymers described herein as electrolyte additives in lead-acid batteries are due to the overall improvement of the conditions for the electrochemical processes of nucleation and crystal growth that lead to the formation of the crystal structures building the positive and negative active masses during charge and discharge of lead-acid batteries.

The specific mechanism of the polyvinylpyrrolidone and polyvinylpyrrolidone derivative synthetic proton-conductive additives in the electrolyte of lead-acid batteries is governed by the thermodynamic parameters of the electrochemical crystallization processes, during crystalline nuclei, and the following crystal growth. These processes are homogenous because in the electrochemical system of the lead-acid battery, lead, sulphate, oxygen, and hydrogen ions and protons are involved, which are present in the volume of the electrolyte. The mechanism of performing the electrochemical crystallization processes is determined by the difference in the electrochemical potential of the crystal phases of the electrodes and the electrolyte solution as compared to the thermal oscillations of the atoms of the substances present in the electrolyte.

Enhancing the operational parameters of lead-acid batteries is due to the fact that the proton-conducting additive in the electrolyte of such batteries influences mainly on their current state. This state is determined by the potential difference of the two electrodes, the temperature, the electrolyte concentration, and the current strength. Presence of proton-conducting additive in the electrolyte maintains these thermodynamic parameters for longer time during their life, which creates conditions for reversible and effective flow of the electrochemical processes of charging and discharging.

The presence of these substances in the electrolyte of lead-acid batteries exerts a strong influence on the electrochemical processes of crystallization and transformation of the crystal phases in the two electrodes during battery operation, which creates favorable conditions for impeding the processes of irreversible sulfation of the battery electrodes. Moreover, the polymer additives described herein sustain higher electrical conductivity in lead-acid batteries, which improves their charge acceptance and thus shortens the time for battery charging. This effect is related to the improved transport characteristics of the proton conductivity of the electrolyte under the action of the addition of polyvinylpyrrolidone or its derivatives.

According to certain embodiments, the electrolyte may comprise a high degree of electrolyte dissociation. For example, the electrolyte may comprise a sulfuric acid solution, although other electrolytes characterized by a high degree of electrolyte dissociation may be used. In all cases, the effectiveness of the additives in the various types of suitable electrolytes will depend on the type, composition, and concentration of the acid or highly conductive electrolyte, which has the potential for electrolytic dissociation. However, it is possible for proton-conducting additives to be used in electrolytes that contain substances, functional groups, or radicals with which the additives can exchange charge with their redox partners of the electrolyte in the respective electrochemical system.

With reference to FIG. 2, a flowchart illustrating an example method of preparing a battery having improved electrolyte performance characteristics is depicted. In the depicted embodiment, the method comprises forming an electrolyte system as shown in Block 201. In some embodiments, forming an electrolyte system comprises providing an electrolyte 120*a* and providing a synthetic proton-conductive polymer additive 120*b*. In some embodiments, the method further comprises forming the battery 100 as shown in Block 202.

In accordance with certain embodiments, forming the electrolyte system can be accomplished in a variety of ways. That is, polyvinylpyrrolidone or its derivatives can be added to the electrolyte of lead-acid batteries in two possible ways. First, in some embodiments, the appropriate amount of additive can be added to the electrolyte to be filled in the lead-acid batteries before their formation. This method of battery formation with an electrolyte containing polyvinylpyrrolidone or its derivatives is suitable for stationary and industrial lead-acid batteries of the AGM or gel types. In these applications, the additive in the electrolyte contributes to the formation of active mass structures at the positive and negative electrodes that remain relatively stable for a longer period of time during their operation and thus the service life of these types of batteries is prolonged. In some embodiments, introducing the additives of polyvinylpyrrolidone or its derivatives to the electrolyte comprises filling the batteries with electrolyte containing the necessary amount of the additives after the battery formation step.

In some embodiments, the battery comprises at least two electrodes and providing the synthetic proton conductive polymer additive comprises depositing particles of the synthetic proton-conductive polymer additive onto a surface of at least one of the two or more electrodes. That is, in accordance with certain embodiments, when polyvinylpyrrolidone and polyvinylpyrrolidone derivative synthetic proton-conductive additives are used, it is possible for particles of these polymers to be deposited on the surfaces of the electrodes. Because the additives possess hydrophilic properties, they facilitate the exchange of electrolyte between the interior of the positive and negative electrodes and the electrolyte in the cell volume. As such, appropriate conditions are created for the electrochemical processes of charge and discharge to proceed more efficiently during operation of lead-acid batteries, which enhances their performance characteristics.

According to certain embodiments, the polyvinylpyrrolidone and polyvinylpyrrolidone derivative synthetic proton-conductive additives may be used with any electrodes where there is a difference in potentials between the two different electrodes in the respective electrochemical system. As such, the influence of the additives is determined by thermodynamics and may be useful for those electrodes in which the additive may affect the value of the free surface energy of the crystalline phases from which the respective electrodes are made. Also important is the ability of polyvinylpyrrolidone and polyvinylpyrrolidone derivative synthetic proton-conductive additives to be adsorbed on the surfaces of the crystals of which the electrodes are composed.

Indeed, the proton-conducting additive that is present in the electrolyte may be characterized by a specific affinity for adsorption on the surface of the active materials that make up the positive and negative electrodes in lead-acid batteries. The internal kinetic mechanism of co-crystallization of the basic substances in the electrodes with the addition of the electrolyte in the lead-acid batteries is of major importance for the action of the proton-conducting additives by which they act on the electrochemical processes. The other specific mechanism by which the electrolyte additive acts on the electrodes is the adsorption kinetic mechanism of adsorption of the proton-conducting additive on the accessible surfaces of the crystalline phases of the respective electrodes. The improvement in the performance of lead-acid batteries is due to the fact that the proton-conducting additive that is introduced into the electrolyte of lead-acid batteries is adsorbed on the surface of the crystals that make up the positive and negative electrodes. As a result, the specific surface energy and shape (habitus) of the crystalline substances of the respective active masses of the electrodes change, which in turn improves the conditions of reversible and efficient performance of electrochemical processes of charge and discharge.

Addition of polyvinylpyrrolidone or its derivatives to the electrolyte of lead-acid batteries has an inhibiting effect on the processes of formation and growth of big lead sulfate crystals during battery operation and thus the operational cycle life of lead-acid batteries can be prolonged. Without intending to be limited by theory, impurities that are added for certain purposes in the active masses or in the electrolyte of lead-acid batteries have a great influence on the crystal growth. In principle, the action of additives, depending on their origin, composition and quantity, can selectively affect the growth of the respective crystal walls of a given crystalline substance, which leads to a change in its shape (habitus) and size. The proton-conducting additives of polyvinylpyrrolidone, polyvinylpyrrolidone-co-styrene and the like, due to their specific ability to adsorb on the surfaces of $PbSO_4$ crystals, create conditions for reducing the growth of these crystals during the discharge of lead-acid batteries. Because these proton-conducting additives in the electrolyte of lead-acid batteries alter the mechanism of crystal growth through their specific and selective adsorption on a particular crystal wall of $PbSO_4$, control the growth of these crystals to a certain smaller size, which allows during the next charge of lead-acid batteries to a more complete recrystallization of metallic lead performed mainly on the negative electrode. This effect is due to the ability of proton-conducting additives in the electrolyte of lead-acid batteries to affect the value of the specific surface energy of the crystalline phases forming their positive and negative electrodes. Such effective modifiers of the shape and value of the specific surface energy that determines the growth rate and crystal size are proton-conducting polymers of the polyvinylpyrrolidone type and its long carbon chain derivatives to which the respective groups and radicals are attached.

In accordance with certain embodiments, polyvinylpyrrolidone and polyvinylpyrrolidone derivative synthetic proton-conductive additives may be used as additives to electrolytes in all types of stationary, traction, and starter lead-acid batteries. Further, while lead-acid batteries are referred to throughout this disclosure, the polyvinylpyrrolidone and polyvinylpyrrolidone derivative synthetic proton-conductive additives may also be used in other types of batteries in which the electrolyte may dissociate. For example, the polyvinylpyrrolidone and polyvinylpyrrolidone derivative synthetic proton-conductive additives may be used in alkaline secondary energy sources, including, but not limited to, nickel-iron, nickel-cadmium, and zinc-air batteries. The polyvinylpyrrolidone and polyvinylpyrrolidone derivative synthetic proton-conductive additives may also be used in primary and secondary electrochemical energy sources in which electrolytes are used with the possibility of exchange of functional groups and radicals with which the proton-conducting additives can form complexes to exchange charges with electrodes in a given electrochemical system.

In accordance with certain embodiments, polyvinylpyrrolidone and polyvinylpyrrolidone derivative synthetic proton-conductive additives may be added to the electrolyte of lead-acid batteries in concentrations varying between about 0.1 to about 0.5 weight percent. It has also been established that addition of about 0.2 to about 0.6 weight percent polyvinylpyrrolidone or polyvinylpyrrolidone-co-styrene to the electrolyte of lead-acid batteries leads to improvement in energetic characteristics, as well as extended service life. In some embodiments in which only one or more than one additive is used, the total amount of the additives should be no more than about 0.1 to about 0.6 weight percent.

In further embodiments, in which starter or traction lead-acid batteries are used, for example, the electrolyte may comprise from about 0.01 to about 3 weight percent of the synthetic proton-conductive additive. Such batteries may be formed by electrolyte recirculation technology. In such technological production processes at the end of the technological process of formation, the batteries are filled with electrolyte with a concentration that corresponds to fully formed lead batteries. In this formation technology, the electrolyte concentration is adjusted at the end of the process by adding a clear acid solution. For this reason, these concentrations are in accordance with the specific technologies used in order to have the necessary residual amount of the additive in the final composition of the electrolyte of the different types of lead batteries.

In accordance with certain embodiments, the batteries employing the electrolyte systems and synthetic proton-conductive additives described herein may be coupled with a bipolar overvoltage battery pulser, referred to as Crystal Control Technology (or CCT), and described in more detail in, for example, U.S. Pat. Nos. 8,436,587 and 8,716,982. An exponential positive effect on battery performance characteristics is provided by coupling CCT with the synthetic proton-conductive additives.

Because the structure of the proton-conducting polymer additive is composed of periodically repeating $P_n$ fragments in its carbon chain, it has been shown that the fragments fully exchange charge with their redox partner in a given electrochemical system. Due to these properties, proton-conducting polymers can change from one redox state to another. As a result of these reactions with the participation of the $P_n$ fragment, cationic (or anionic) radicals are formed and conditions are created for the formation of di-cations (or di-anions), which processes can be represented by the following scheme:

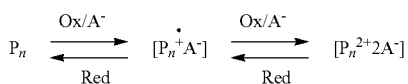

CCT actively maintains the ionic state of all ions that are in the volume of the electrolyte. This additional effect of CCT significantly supports the adsorption kinetic mechanism of adsorption of the proton-conducting additive when it is deposited on the accessible surfaces of the crystalline phases of the respective electrodes. This greatly facilitates the electrochemical crystallization processes when charging and discharging lead-acid batteries.

The combination of CCT with the synthetic proton-conductive additives described herein may also improve the performance of lead-acid batteries at low temperatures. Indeed, the combination of CCT with the synthetic proton-conductive additives provides beneficial results in final discharge capacities, which in turn meet more fully the thermodynamic requirements for efficient and reversible flow of electrochemical processes of charge and discharge of batteries.

EXAMPLES

As is well known, the efficiency of the electrochemical processes that determine the performance characteristics of lead-acid batteries depends mostly on the composition and the properties of the electrolyte, i.e. the sulfuric acid solution.

The use of electrolytes containing polyvinylpyrrolidone and polyvinylpyrrolidone derivative synthetic proton-conductive additives affects the morphology of the active masses formed at the positive and negative electrodes. The positive effect of these electrolyte additives is due to the fact that they create favorable conditions for the nucleation and crystal growth processes in the positive and negative active masses and improve the electrical conductivity of the electrolyte at different concentrations and operating temperatures.

Through the use of the electrolyte system described herein containing an polyvinylpyrrolidone and polyvinylpyrrolidone derivative synthetic proton-conductive additive, it is possible to improve the efficiency of the electrochemical processes of transformation of lead and lead dioxide to lead sulfate, and back to lead or lead dioxide again at the two types of electrodes during cycling of lead-acid batteries.

The presence of polyvinylpyrrolidone and polyvinylpyrrolidone derivative synthetic proton-conductive additives in the electrolyte of lead-acid batteries does not impair the mechanical properties of the positive and negative electrodes and does not favor, but rather inhibits, the occurrence of irreversible processes in the batteries, thus exerting a positive effect on the operational life span of these batteries.

The following examples illustrate, but do not limit, certain embodiments described herein.

Example 1

An electrolyte system (E1), comprising sulfuric acid solution and polyvinylpyrrolidone, was prepared for use in starter lead-acid cells and batteries.

First, the initial polyvinylpyrrolidone solution (P1) was prepared:

380 g of polyvinylpyrrolidone (mol. wt. 360,000; Lot Number 090H0614) was put in a 2000 ml vessel, and $H_2SO_4$ solution with a density of 1.28 g/cm$^3$ was poured in the vessel under continuous stirring until a volume of 1000 ml was reached.

Then, the electrolyte system (E1) for flooding non-formed lead-acid batteries was prepared:

5200 ml of $H_2SO_4$ solution with a density of 1.25 g/cm$^3$ was poured in a vessel of appropriate volume and 12.48 ml of the initial (P1) solution containing polyvinylpyrrolidone was added under continuous stirring to the $H_2SO_4$ solution in the vessel. Stirring of the electrolyte system in the vessel was continued for 10-15 more minutes. The prepared electrolyte was left to rest for 5-7 hours and was then ready for use.

The temperature of the electrolyte system during preparation should not exceed 25-28° C. and not fall below 12-15° C.

Example 2

An electrolyte system (E2), comprising sulfuric acid solution and polyvinylpyrrolidone-co-styrene, was prepared for use in stationary lead-acid cells and batteries.

First, the initial polyvinylpyrrolidone-co-styrene solution (P2) was prepared:

100 ml of poly(1-vinylpyrrolidone-co-styrene), 38% emulsion in water, Brookfield viscosity 2,000,000-800,000, was poured in a vessel with 2000 ml volume. Then, 900 ml of $H_2SO_4$ solution with a density of 1.28 g/cm$^3$ was added in the vessel under continuous stirring.

Then, the electrolyte system (E2) for flooding non-formed stationary lead-acid batteries was prepared:

5200 ml of $H_2SO_4$ solution with a density of 1.25 g/cm$^3$ was poured in a vessel of appropriate volume and 25 ml of the initial (P2) solution containing polyvinylpyrrolidone-co-styrene was added under continuous stirring. Stirring of the electrolyte in the vessel continued for 10-20 more minutes, and the prepared electrolyte (E2) was left to rest for 2 hours, after which it was ready for use.

The temperature of the electrolyte system during preparation should not exceed 25-28° C. and not fall below 12-15° C.

Example 3

The performance characteristics of E1 and E2 were compared to each other and control batteries. A bar chart illustrating the data collected from these trials is shown in FIG. 3.

Measurements of the final discharge capacities of 45 Ah starter lead batteries made with electrolyte systems E1 and E2 were performed on a standard test mode with a current corresponding to 10 hours of discharge and showed values higher than the values of the final discharge capacities of the control batteries for 30 charge-discharge cycles.

For 45 Ah starter lead batteries made with electrolyte system E1, the values of the final discharge capacities were on average 20 to 25% higher than the values of the final discharge capacities of the control batteries after 30 consecutive test charge-discharge cycles under the C10 mode.

For 45 Ah starter lead-acid batteries made with electrolyte system E2, the values of the final discharge capacities were on average 25 to 30% higher than the values of the final discharge capacities of the control batteries, after 30 consecutive test charge-discharge cycles under the C10 mode.

Example 4

The performance characteristics of E1 and E2 were compared to each other and control batteries when coupled with CCT and compared to the results when not coupled with CCT. A bar chart illustrating the data collected from these trials is shown in FIG. 4.

Measurements of the final discharge capacities of 45 Ah starter lead batteries made with electrolyte systems E1 and E2 were performed on a standard test mode with a current corresponding to 10 hours of discharge and showed values higher than the values of the final discharge capacities of the control batteries for 30 charge-discharge cycles.

For the control batteries, the values of the final discharge capacities were on average 9% higher for those batteries coupled with CCT than the values of the final discharge capacities of the batteries that were not coupled with CCT, after 30 consecutive test charge-discharge cycles under the C10 mode.

For 45 Ah starter lead batteries made with electrolyte system E1, the values of the final discharge capacities were on average 11% higher for those batteries coupled with CCT than the values of the final discharge capacities of the batteries that were not coupled with CCT, after 30 consecutive test charge-discharge cycles under the C10 mode.

For 45 Ah starter lead-acid batteries made with electrolyte system E2, the values of the final discharge capacities were on average 12% higher for those batteries coupled with CCT than the values of the final discharge capacities of the batteries that were not coupled with CCT, after 30 consecutive test charge-discharge cycles under the C10 mode.

Example 5

During experiments to determine conductivity of the electrolytes with the proposed additives, varying temperatures were observed. No change in the conductivity of the electrolyte was found in comparison with the control sample at different temperature.

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An electrolyte system for improving electrolyte performance characteristics, the electrolyte system comprising:
   an electrolyte comprising sulfuric acid; and a synthetic proton-conductive polymer additive, wherein the electrolyte system comprises greater than about 0.2 and less than about 0.6 weight percent of the synthetic proton-conductive polymer additive, and wherein the synthetic proton-conductive polymer additive comprises polyvinylpyrrolidone-co-styrene.

2. The electrolyte system according to claim 1, wherein the electrolyte system is devoid of other additives.

3. The electrolyte system according to claim 1, wherein the electrolyte system comprises one or more other additives.

4. A battery having improved electrolyte performance characteristics, the battery comprising:
   two or more electrodes; and
   an electrolyte system, the electrolyte system comprising an electrolyte comprising sulfuric acid and a synthetic proton-conductive polymer additive, wherein the electrolyte system comprises greater than about 0.2 and less than about 0.6 weight percent of the synthetic proton-conductive polymer additive, and wherein the synthetic proton-conductive polymer additive comprises polyvinylpyrrolidone-co-styrene.

5. The battery according to claim 4, wherein the battery comprises a lead-acid battery.

6. The battery according to claim 5, wherein the battery is coupled with a bipolar overvoltage battery pulser.

7. The battery according to claim 4, wherein the electrolyte system is devoid of other additives.

8. The battery according to claim 4, wherein the electrolyte system comprises one or more other additives.

9. A method of preparing the battery according to claim 4, the method comprising:
   forming the electrolyte system, wherein forming the electrolyte system comprises providing the electrolyte and providing the synthetic proton-conductive polymer additive; and
   forming the battery.

10. The method of claim 9, wherein forming the electrolyte system comprises adding the synthetic proton conductive polymer additive to the electrolyte before forming the battery.

11. The method of claim 9, wherein forming the electrolyte system comprises adding the synthetic proton conductive polymer additive to the electrolyte after forming the battery.

12. The method of claim 9, wherein providing the synthetic proton conductive polymer additive comprises:
   depositing particles of the synthetic proton-conductive polymer additive onto a surface of at least one of the two or more electrodes.

13. The method of claim 9, further comprising coupling the battery with a bipolar overvoltage battery pulser.

* * * * *